Patented Feb. 27, 1951

2,543,602

UNITED STATES PATENT OFFICE 2,543,602

POLYMERIC IMIDO-ESTERS PREPARED FROM MALEIC HETEROPOLYMERS AND BIS-AZOLINES

Stanley P. Rowland, Philadelphia, Pa., assignor to Rohm & Haas Company, Philadelphia, Pa., a corporation of Delaware No Drawing. Application December 30, 1949, Serial No. 136,134

16 Claims. (Cl. 260—78.5)

1

This invention relates to a new class of resinous materials and to a process of preparing them.

The products of this invention are polymeric, resinous imido-esters and they are made by chemically reacting a bis-oxazoline or a bis-thiazoline with a heteropolymer of maleic anhydride and a polymerizable, vinylidene compound containing a single vinylidene group, $>C=CH_2$.

The bis-azolines, that is, the bis-oxazolines or bis-thiazolines, which react with the maleic anhydride heteropolymers have the general formula

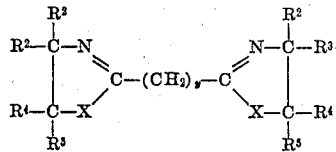

in which $y$ is an integer of value 4 to 8 inclusive; X represents an atom of oxygen or sulfur; and the characters, $R^2$, $R^3$, $R^4$ and $R^5$ represent hydrogen atoms or monovalent organic radicals which are unreactive with acid anhydrides and therefore are free of alcoholic hydroxyl groups and amino-hydrogen atoms and which preferably are hydrocarbon radicals. Reaction takes place between the bis-azolines and the anhydride groups which are present in the maleic anhydride heteropolymer.

It is known that in a heteropolymer of maleic anhydride and a vinylidene compound containing a single vinylidene group there are free anhydride groups along the polymer chain and that the number of these is proportional to the amounts of maleic anhydride and the copolymerizable monovinylidene compound which are polymerized together. When, to take a convenient example, equimolar amounts of styrene and maleic anhydride are copolymerized, the styrene and maleic portions alternate in the chain of the copolymer. Thus in this example, which is limited to a styrene heteropolymer but which is typical of the heteropolymers or copolymers of maleic anhydride and the other monovinylidene compounds, the heteropolymer is made up of recurring units, each of which has the following structure:

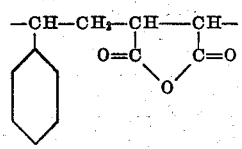

Since the bis-azolines contain two functional groups, they can react with two anhydride groups in the heteropolymers. Thus one molecule of bis-azoline can react with two anhydride groups in

2 the same molecule of heteropolymer or with one anhydride group in each of two molecules of the heteropolymers. In the latter case the bis-azoline serves as a connecting or cross-linking bridge between two molecules, and as the cross-linking progresses by continued reaction of the heteropolymer and the bis-azoline the product becomes insoluble, infusible and thermoset.

The two following equations show how a bis-azoline reacts in one case with two anhydride groups in the same molecule of a styrene-maleic anhydride copolymer (I) and in the second case how it reacts with one anhydride group in each of two molecules of the copolymer. Actually both reactions take place simultaneously. Furthermore, as is the case with other bi-functional cross-linking agents, the bis-azolines can and do actually join more than two molecules of the heteropolymers together with the result that the product is very high in molecular weight, is very complex, and has properties quite unlike those of the original heteropolymer. While the following equations are directed to the reaction of styrene-maleic anhydride heteropolymers and bis-azolines, it should be noted that the other heteropolymers described herein of maleic anhydride and other polymerizable monovinylidene compounds react in the same way.

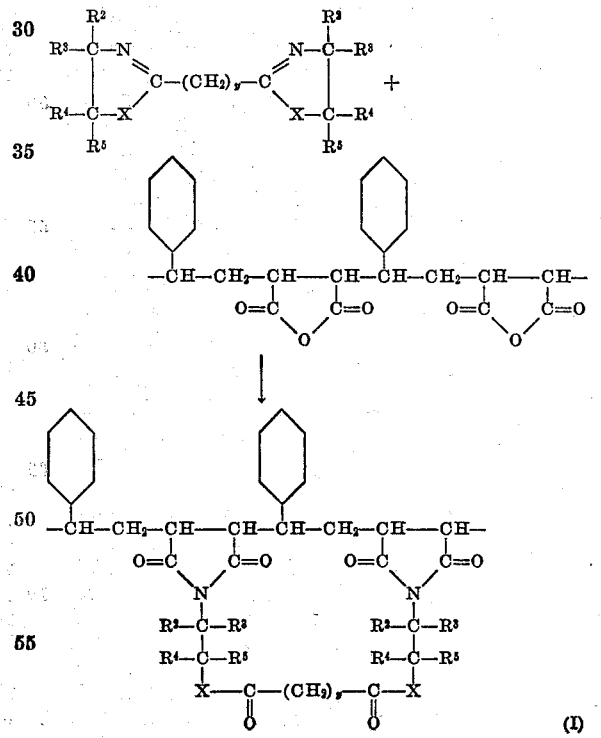

(I)

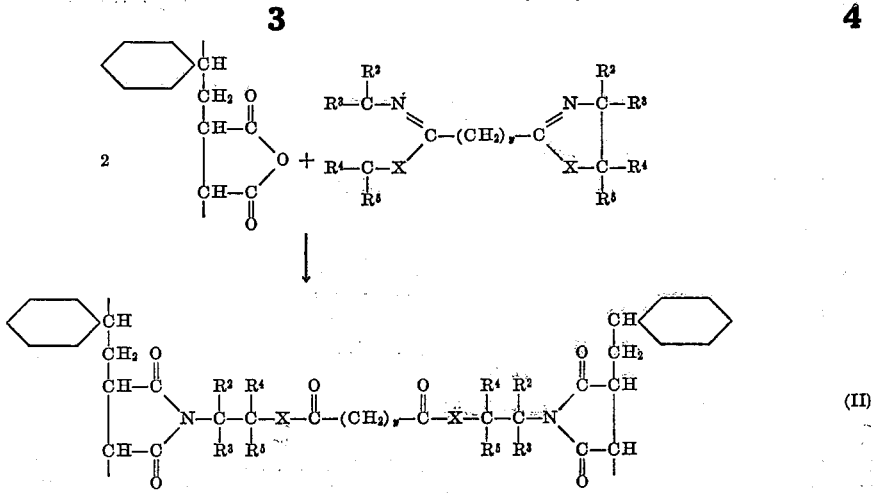

(II)

The heteropolymers of maleic anhydride and the monovinylidene compounds, which react with bis-azolines by the process of this invention, are themselves well known and are readily prepared by heating maleic anhydride and one or more monovinylidene compounds, preferably in the presence of a peroxidic catalyst. Their preparation is shown for example in U. S. Patents Nos. 2,047,398 to Voss et al., 2,286,062 to Condo et al., and 2,320,724 to Gehart et al., to which patents reference is hereby made.

The monovinylidene compounds all contain a single vinylidene group, $>C=CH_2$, and all are capable of polymerizing alone and copolymerizing with maleic anhydride to form thermoplastic polymers which are soluble in organic solvents. Typical monovinylidene compounds which copolymerize with maleic anhydride to form heteropolymers, which in turn react with the process of this invention with bis-azolines, include the following: vinyl halides such as vinyl chloride and vinyl bromide; vinyl ethers such as methyl vinyl ether, naphthyl vinyl ether, phenyl vinyl ether, cyclohexyl vinyl ether, isopropyl vinyl ether; vinyl hydrocarbons such as styrene and vinyl naphthalene; heterocyclic compounds such as vinyl pyridene and vinyl carbazole; vinyl esters such as vinyl acetate and vinyl propionate; esters of acrylic and methacrylic acids such as ethyl acrylate, methylacrylate, butyl acrylate, octyl methacrylate; acrylonitrile; methacrylonitrile; acrylamide and methacrylamides; acrylic acid and methacrylic acid; methyl vinyl ketone; isopropyl vinyl ketone; allyl esters of saturated monocarboxylic acids, such as allyl acetate and allyl stearate; and the like. The bis-azolines react with the acid anhydride portion of the heteropolymer and the remainder of the so-called "unit" in the polymeric chain does not take part in the reaction with the azoline although it necessarily contributes to the physical properties of the final polymeric imido-ester. Bis-azolines react likewise with the heteropolymers of maleic anhydride and more than one monovinylidene compound as for example with a heteropolymer of maleic anhydride, styrene and acrylonitrile.

The physical properties of the heteropolymers depend on the particular monovinylidene compounds which are copolymerized with the maleic anhydride and on the ratio of the two copolymerizable compounds, but the physical properties of the heteropolymer do not apparently affect the reaction of the heteropolymers with the bis-azolines, which is the process of this invention. In all cases however the heteropolymers must be thermoplastic and soluble in an organic solvent such as toluene, xylene, acetone or dioxane. The heteropolymers should also contain from about 1% to about 50% copolymerized maleic anhydride on a molar basis. This assures that the heteropolymer contain sufficient anhydride groups for reactivity with the bis-azolines.

As the bis-azolines react with the heteropolymers the product goes through a gel stage and ultimately to an insoluble, infusible stage. When the heteropolymer is already of high molecular weight, say of the order of a hundred thousand, less cross-linking by the bis-azoline is required in order to convert the heteropolymer to the gelled or insoluble condition and therefore a maleic anhydride content of about 1% is adequate. When, however, the molecular weight of the heteropolymer is lower, say in an intermediate range of the order of about 20 to 30 thousand, then more cross-linking by the bis-azoline is required in order to convert the heteropolymer to the gelled or insoluble condition. In such cases—and many heteropolymers are of such intermediate molecular weight—a minimum maleic anhydride content of about 5% is ordinarily necessary. In the case of those heteropolymers of relatively low molecular weight, say of the order of a few thousand or less, more cross-linking by the bis-azoline is required, and in order for more bis-azoline to react there must be more anhydride groups or units in the heteropolymer and the latter should contain up to about 50% of copolymerized maleic anhydride on a molar basis.

The heteropolymers of styrene and maleic at present show the greatest promise particularly in view of their low cost, availability and speedy reaction with azolines. Such polymers, ranging from the "tetromer" of average molecular weight around 800 to those of molecular weight at least as high as 100,000, have been reacted with a very large variety of bis-oxazolines and bis-thiazolines and have given rise to entirely new kinds of resinous imido-esters.

The bis-oxazolines and bis-thiazolines which react with the heteropolymers by the process of this invention are those which have the general formula given above. It is to be noted that the groups represented by $R^2$, $R^3$, $R^4$, $R^5$ and X, as well as the value of $y$, are not altered by the reaction with the heteropolymer. That is, they remain intact during the reaction between the heteropolymer and the bis-azoline.

So that no interfering side-reaction can take place, it is necessary that the organic radicals which are represented by the R's be unreactive with acid anhydrides. Thus, they must be free of such substituents as hydroxyl groups and amino-hydrogen atoms. Whether or not a particular substituent is reactive with acid anhydrides is well within the knowledge of one skilled in chemistry. It is much preferred that the radicals which are represented by the R's be hydrocarbon radicals such as alkyl, aryl, aralkyl, alkaryl and cycloalkyl. The following list includes examples of such suitable, hydrocarbon radicals: methyl, ethyl, isopropyl, sec.-butyl, tert.-amyl, 2-ethylhexyl, lauryl, n-tetradecyl and octadecyl groups and the isomers of these groups; phenyl, tolyl, benzyl, p-octylphenyl, m-xylyl, 2,4-di-tert.-amylphenyl, cyclohexyl and naphthyl groups.

Although those bis-azolines are preferred in which the substituents represented by the R's are hydrocarbon radicals, it is a fact that the maleic anhydride copolymers react readily and satisfactorily with bis-azolines in which the substituents, R's $^2$ to $^5$, also contain other elements in addition to carbon and hydrogen. Thus, halogen groups may be present as well as nitro, ether, keto, aldehydo, sulfonic, and tertiary amine groups. None of these groups reacts with the acid anhydrides and none interferes with the reaction of the heteropolymer with the bis-oxazolines or bis-thiazolines.

The reaction between the bis-azolines and the heteropolymers takes place fairly readily and often exothermically. Reaction takes place even at room temperature (ca. 20° C.) especially when a copolymer and a bis-azoline are dissolved in a volatile solvent and are deposited as a thin air-drying film. Heating of the reactants accelerates the rate of reaction and for this reason a minimum temperature of 50° C. is recommended. Temperatures up to 300° C. are operable but an upper temperature of 250° C. is much preferred. It has also been found that in general it is advantageous to maintain as low a temperature of reaction as is feasible when the bis-azoline carries two substituents, such as alkyl groups, in the positions occupied by $R^4$ and $R^5$ in the general formula above. In such cases a maximum temperature of about 150° C. is suggested. When the resinous product is to be isolated in bulk, the reactants are combined in a reactor; but this is not always necessary. For example, a mixture of the reactants, preferably in solution, can be applied to the surface of an object which it is desired to coat and protect, and the coated object can then be baked in an oven. During the baking period, the reactants combine to form the new polymeric product as a firm coating on the object. Furthermore, mixtures of powdered heteropolymers and bis-azolines, preferably without solvent, can be molded and simultaneously reacted by applying heat to such a mixture in a closed mold. This method of reacting and molding at the same time is quite satisfactory because no volatile product, such as water, is liberated by the reaction between the heteropolymer and the bis-azoline.

For convenience, inert solvents can be employed. Likewise catalysts, such as alcoholates, zinc chloride and the like can be used, although ordinarily the reaction takes place rapidly enough in the absence of catalysts. Other expedients well known to those skilled in the art, such as variations in pressure, solvent-extraction of the product, excess of one reactant, and the like, can be used without departing from the spirit of this invention which is one of preparing new resinous imido-esters by combining bis-oxazolines or bis-thiazolines as defined herein with heteropolymers of maleic anhydride and a monovinylidene compound.

It is evident from the equations above, which are confined for convenience to styrene-maleic anhydride heteropolymers but which are typical of the reaction of the other heteropolymers, that one molecule of bis-azoline can combine with two anhydride groups in the heteropolymer. The course of the reaction therefore is readily followed by titrating the reaction mixture with standard alkali since the alkali neutralizes the free and unreacted anhydride groups. Such is a conventional method of determining the acid number of resinous materials.

When every anhydride group in the heteropolymer reacts with one azoline ring, then one-half mole of the bis-azoline is required for every mole of copolymerized maleic anhydride. Such a reaction gives rise to a non-acidic gel. If more than this ratio of bis-azoline is employed then only one azoline ring of some of the molecules of bis-azoline can react. If less than this ratio of bis-azoline is employed then the product becomes an acidic gel or infusible material. It is apparent that not all of the anhydride groups need react with the bis-azolines to cause gelation particularly if the heteropolymer is originally of fairly high molecular weight and contains a fairly high ratio of copolymerized maleic anhydride. Therefore, the complete range of concentration of the bis-azoline should be from about 0.05 mole to 1 mole per mole of copolymerized maleic anhydride, which range covers the amount required to produce gels from heteropolymers of high molecular weight or to yield product in which only one azoline ring of the bis-azoline is reacted.

As the reaction progresses by combination of the bis-azoline and the anhydride groups in the heteropolymer, the acid number of the resin decreases. In those instances where it is desirable to employ less than enough bis-azoline to react with all of the anhydride groups in the heteropolymer, the unreacted anhydride groups can be readily converted to salts for example by neutralization, or to esters by reaction with alcohols. Alternatively, some of the anhydride groups can be neutralized or esterified first, and the remainder then reacted with the azoline. As the reaction continues the resinous molecules become increasingly complex. Ultimately, the product becomes cross-linked to such an extent that it gels, then loses its solubility, and finally becomes thermoset.

The following examples are presented in order to illustrate—and not to limit—this invention. The reaction of the bis-oxazolines and bis-thiazolines with the heteropolymers is ordinarily complete after about two to four hours of heating at about 125° C. to about 200° C. This new reaction provides a large class of new resins differing in degree from one another as to the ratio of maleic anhydride to the monovinylidene compound in the heteropolymer and as regards the kind of copolymerized monovinylidene compound, as regards the number of methylene groups joining the two azoline rings, and finally as regards the substituents, R's $^2$ to $^5$, on the bis-azoline. All of the bis-azolines and heteropolymers described herein, however, react in the same way; and their reaction is typified by the following examples:

*Example 1*

One mole of styrene and one mole of maleic anhydride were copolymerized in 606 grams of acetone in the presence of 2.02 grams of benzoyl peroxide, which served as a catalyst of polymerization. The copolymerization was complete after 5.5 hours at 60° C. The dry polymer was isolated by evaporation of the acetone from the polymer solution on the periphery of a hot (steam heated), revolving drum.

Two grams of the resultant powder was mixed thoroughly with 1.38 grams of 1,8-octamethylene-bis-2-(5-methyl) oxazoline and the mixture was placed in a cylindrical mold having a diameter of one inch. A pressure of 8,000 pounds per square inch was applied and the mold was heated to 190° C. The resulting disc was hard and tough and was insoluble in xylene, acetone, and other common lacquer-solvents.

In contrast, a disc of the styrene-maleic adduct alone which was molded at the same temperature and pressure was readily soluble in acetone and was thermoplastic. It is apparent therefore that the reaction of the heteropolymer and the bis-oxazoline resulted in a thermoset, cross-linked product.

Examples 2-12

In a similar manner to that described above, heteropolymers containing various amounts of copolymerized maleic anhydride with other vinylidene compounds were mixed with bis-azolines and molded at 150° C. and 8,000 pounds per square inch pressure. In every case the molded product was insoluble in acetone or xylene and was infusible, whereas in every case the disc which was obtained by molding the same heteropolymer alone in the absence of the bis-azoline was thermoplastic and soluble. Following is a tabulation of the heteropolymers and bis-azolines which yielded thermoset and insoluble products:

|   | Monomer Copolymerized with Maleic Anhydride | Molar Ratio of Maleic Anhydride to Vinyl Monomer | Bis-Azoline | Molar Ratio of Bis-Azoline to Maleic in the Heteropolymer |
|---|---|---|---|---|
| 2 | Styrene | 1/1 | 1,4-tetramethylene-bis-2-(4,5-dimethyloxazoline) | 0.5 |
| 3 | do | 1/1 | 1,8-octamethylene-bis-2-(5-phenyloxazoline) | 0.2 |
| 4 | do | 1/1 | 1,6-hexamethylene-bis-2-(5-methylthiazoline) | 0.5 |
| 5 | do | 1/1 | 1,6-hexamethylene-bis-2-(5-p-chlorophenyloxazoline) | 0.3 |
| 6 | Vinyl acetate | 1/1 | 1,4-tetramethylene-bis-2-(5-methyloxazoline) | 0.5 |
| 7 | Methyl methacrylate | 0.1/1 | 1,7-heptamethylene-bis-2-(4,4,5-trimethyloxazoline) | 0.5 |
| 8 | do | 0.3/1 | 1,4-tetramethylene-bis-2-(5-p-nitrophenyloxazoline) | 0.3 |
| 9 | do | 0.3/1 | 1,4-tetramethylene-bis-2-(5-ethyloxazoline) | 0.5 |
| 10 | Acrylonitrile | 0.1/1 | 1,4-tetramethylene-bis-2-(5-methyloxazoline) | 0.5 |
| 11 | do | 0.25/1 | 1,4-tetramethylene-bis-2-(5-methylthiazoline) | 0.5 |
| 12 | do | 0.25/1 | 1,8-octamethylene-bis-2-(4,5-dimethyloxazoline) | 0.5 |

Examples 13-23

In this series of reactions, acetone solutions of heteropolymers and bis-azolines were employed. These solutions were low in viscosity and contained approximately 25 to 50% of solutes. The solutions were poured on glass-plates and were allowed to dry at room temperature for 8 hours. It was observed that all of the films were dry to the touch in less than an hour (excepting numbers 22 and 23) and all were insoluble in acetone, dioxane or xylene at the end of eight hours. In contrast, films of the heteropolymers alone remained soluble. Following is a tabulation of some of the combinatins of heteropolymers and bis-azolines which yielded insoluble films:

|   | Monomer Copolymerized with Maleic Anhydride | Molar Ratio of Maleic to Monomer | Bis-Azoline | Molar Ratio of Bis-Azoline to Maleic in Heteropolymer |
|---|---|---|---|---|
| 13 | Styrene | 1:1 | 1,4-tetramethylene-bis-2-(5-phenyloxazoline) | 0.5 |
| 14 | do | 1:1 | 1,8-octamethylene-bis-2-(4,5-dimethyloxazoline) | 0.25 |
| 15 | do | 1:1 | 1,4-tetramethylene-bis-2-(5-methylthiazoline) | 0.3 |
| 16 | Methyl methacrylate | 1:4 | 1,6-hexamethylene-bis-2-(5-methyloxazoline) | 0.5 |
| 17 | do | 1.5 | 1,4-tetramethylene-bis-2-(5-hexyloxazoline) | 0.25 |
| 18 | do | 1:4 | 1,5-pentamethylene-bis-2-(5-chlorophenyloxazoline) | 0.4 |
| 19 | Acrylonitrile | 1:10 | 1,4-tetramethylene-bis-2-(5-methyloxazoline) | 0.5 |
| 20 | do | 1:4 | 1,4-tetramethylene-bis-2-(5-ethylthiazoline) | 0.3 |
| 21 | do | 1:4 | 1,8-octamethylene-bis-2-(4,4,5-trimethyloxazoline) | 0.5 |
| 22 | Ethyl acrylate | 1:5 | 1,8-octamethylene-bis-2-(4,4,5-trimethyloxazoline) | 0.5 |
| 23 | do | 1:4 | 1,4-tetramethylene-bis-2-(5-methyloxazoline) | 0.4 |

Example 24

Portions of the solutions which were employed in Examples 13-23 above were warmed on a water-bath. In every instance the solutions had changed to homogeneous, gelled masses in less than an hour, which indicates that the rate of reaction of the maleic-anhydride copolymers and bis-azolines is relatively rapid.

Although the above discussion and examples are limited to the combination of bis-azolines with heteropolymers of maleic anhydride it must be pointed out that the copolymers of monovinylidene compounds and the anhydrides of citraconic and itaconic acids also react with bis-oxazolines and bis-thiazolines to form polymeric materials containing imido groups in a like manner. Furthermore, the bis-thiazolines react in the same way as the bis-oxazolines.

The products of this invention are all polymeric and accordingly are presently most valuable as molding plastics and as surface-coatings.

I claim:

1. A process for the preparation of a polymeric imido-ester which comprises chemically reacting, at a temperature from 20° C. to 300° C., a thermoplastic heteropolymer of maleic anhydride and a monovinylidene compound with a bis-azoline of the general formula

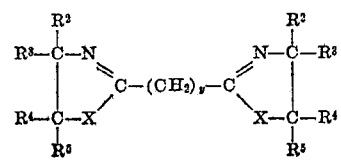

in which y is an integer of value 4 to 8 inclusive; X represents an atom of an element from the class consisting of oxygen and sulfur; the characters $R^2$, $R^3$, $R^4$ and $R^5$, represent members of the class consisting of hydrogen atoms and alkyl, aryl, aralkyl, alkaryl, and cycloalkyl groups.

2. A process for the preparation of a polymeric imido-ester which comprises chemically reacting, at a temperature from 20° C. to 300° C., a thermoplastic heteropolymer of maleic anhydride and a monovinylidene compound with a bis-azoline of the general formula

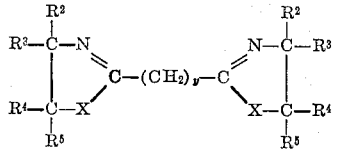

in which y is an integer of value 4 to 8 inclusive; X represents an atom of an element from the class consisting of oxygen and sulfur; the characters, $R^2$, $R^3$, $R^4$ and $R^5$, represent members of the class consisting of hydrogen atoms and alkyl, aryl, aralkyl, alkaryl, and cycloalkyl groups, said heteropolymer containing about 1% to about 50% copolymerized maleic anhydride on a molar basis.

3. A process for the preparation of a resinous product which comprises reacting, at a temperature from 20° C. to 250° C., a thermoplastic heteropolymer of styrene and maleic anhydride with a bis-azoline of the general formula

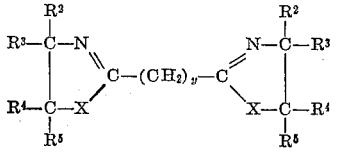

in which y is an integer of value 4 to 8 inclusive; X represents an atom of an element from the class consisting of oxygen and sulfur; the characters, $R^2$, $R^3$, $R^4$ and $R^5$, represent members of the class consisting of hydrogen atoms and alkyl, aryl, aralkyl, alkaryl, and cycloalkyl groups.

4. A process for the preparation of a resinous product which comprises chemically reacting, at a temperature from 20° C. to 250° C., (1) a thermoplastic heteropolymer of about 99% to 50% styrene and about 1% to 50% maleic anhydride, on a molar basis, with (2) a bis-azoline of the general formula

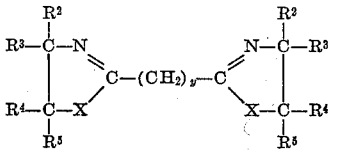

in which y is an integrer of value 4 to 8 inclusive; X represents an atom of an element from the class consisting of oxygen and sulfur; the characters, $R^2$, $R^3$, $R^4$ and $R^5$, represent members of the class consisting of hydrogen atoms and alkyl, aryl, aralkyl, alkaryl, and cycloalkyl groups.

5. A process for the preparation of a resinous product which comprises chemically reacting, at a temperature from 20° C. to 250° C., (1) a thermoplastic heteropolymer of about 99% to 50% styrene and about 1% to 50% maleic anhydride, on a molar basis, with (2) 1,4-tetramethylene-bis-2-(5-methyloxazoline).

6. A process for the preparation of a resinous product which comprises chemically reacting, at a temperature from 20° C. to 250° C., (1) a thermoplastic heteropolymer of about 99% to 50% styrene and about 1% to 50% maleic anhydride, on a molar basis, with (2) 1,6-hexamethylene-bis-2-(5-methyloxazoline).

7. A process for the preparation of a resinous product which comprises chemically reacting, at a temperature from 20° C. to 250° C., (1) a thermoplastic heteropolymer of about 99% to 50% styrene and about 1% to 50% maleic anhydride, on a molar basis, with (2) 1,8-octamethylene-bis-2-(5-methyloxazoline).

8. A process for the preparation of a resinous product which comprises chemically reacting, at a temperature from 20° C. to 250° C., (1) a thermoplastic heteropolymer of about 99% to 50% styrene and about 1% to 50% maleic anhydride, on a molar basis, with (2) 1,4-tetramethylene-bis-2-(5-phenyloxazoline).

9. A process for the preparation of a resinous product which comprises chemically reacting, at a temperature from 20° C. to 250° C., (1) a thermoplastic heteropolymer of about 99% to 50% styrene and about 1% to 50% maleic anhydride, on a molar basis, with (2) 1,8-octamethylene-bis-2-(5-phenyloxazoline).

10. A resinous composition as prepared by the process of claim 1.

11. A resinous composition as prepared by the process of claim 3.

12. A resinous composition as prepared by the process of claim 5.

13. A resinous composition as prepared by the process of claim 6.

14. A resinous composition as prepared by the process of claim 7.

15. A resinous composition as prepared by the process of claim 8.

16. A resinous composition as prepared by the process of claim 9.

STANLEY P. ROWLAND.

REFERENCES CITED

The following references are of record in the file of this patent:

UNITED STATES PATENTS

| Number | Name | Date |
|---|---|---|
| 2,279,410 | Nadeau et al. | Apr. 14, 1942 |
| 2,301,356 | Arnold | Nov. 10, 1942 |
| 2,370,943 | Dietrich | Mar. 6, 1945 |

FOREIGN PATENTS

| Number | Country | Date |
|---|---|---|
| 479,838 | Great Britain | Feb. 11, 1938 |